United States Patent [19]

Furukawa et al.

[11] Patent Number: 4,745,240
[45] Date of Patent: May 17, 1988

[54] SEE-THROUGH COORDINATE GRAPHIC INPUT TABLET

[75] Inventors: Mikio Furukawa, Tokyo; Yutaka Omori; Klyomichi Ihara, both of Saitama, all of Japan

[73] Assignee: Shin-Etsu Polymer Co., Ltd., Tokyo, Japan

[21] Appl. No.: 889,088

[22] Filed: Jul. 23, 1986

[30] Foreign Application Priority Data

Jul. 23, 1985 [JP] Japan .................................. 60-162281

[51] Int. Cl.⁴ .............................................. G08C 21/00
[52] U.S. Cl. ..................................................... 178/18
[58] Field of Search ............................ 178/18, 19, 21

[56] References Cited

U.S. PATENT DOCUMENTS 4,620,062 10/1986 Mizzi et al. ........................... 178/18

Primary Examiner—Stafford D. Schreyer
Attorney, Agent, or Firm—Jules E. Goldberg

[57] ABSTRACT

The see-through coordinate input tablet is formed of two oppositely facing elements each made of a transparent substrate provided with fine metal wires running in parallel on the inward surface of the substrate, the running directions on the two substrates being perpendicular to each other. At least either one of the elements is provided with a detecting resistor along a side periphery crossing the end portions of the parallel-running metal wires so that the accuracy and reliability in the detection of the coordinates of the inputted point can be improved.

5 Claims, 2 Drawing Sheets

FIG.3a   FIG.3b   FIG.4a   FIG.4b
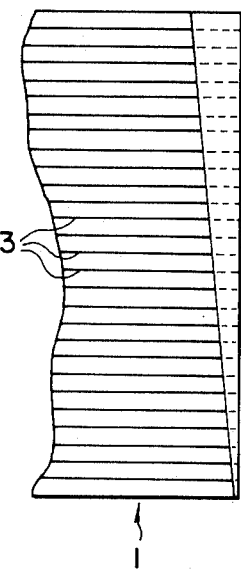 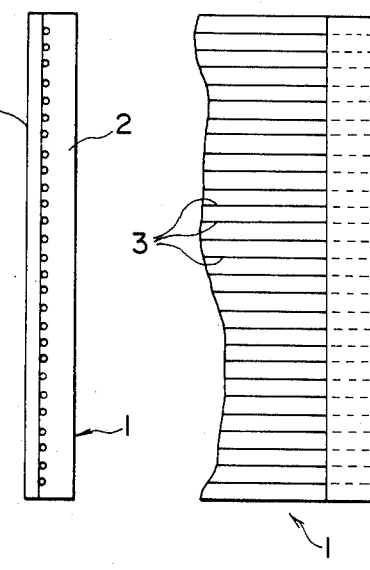
FIG. 5
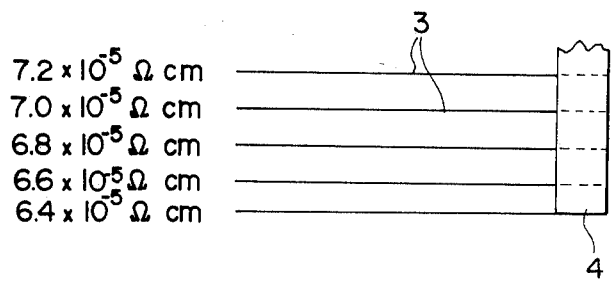
FIG. 6
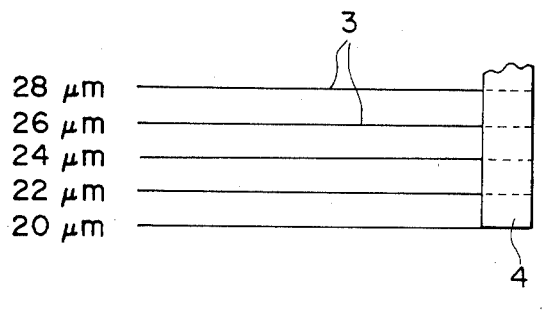

SEE-THROUGH COORDINATE GRAPHIC INPUT TABLET

BACKGROUND OF THE INVENTION

The present invention relates to a coordinate graphic input tablet or more particularly, to a see-through coordinate graphic input tablet of the electrode-contact type.

Among various types of coordinate input tablets, see-throughness is required in those used as installed on or in front of a display unit such as CRTs, LCDs and the like, multiple-term input panels and graphic illustrations such as figures and letter signs. Several types of such see-through coordinate input tablets are hitherto proposed including those of the electrode-contact type by constructing a membrane switch using a transparent and electroconductive material, those of the optical-matrix type in which a light source and a photosensor are combined to detect the coordinates of a body on the path of the light beam, those of the pressure type in which the pressure produced by touching at a position on the tablet is detected, those of the electrostatic-capacity type in which the change in the electrostatic capacity produced by touching is detected, those of the surface acoustic wave type in which the coordinates of a point are detected by means of the time taken for the propagation of the surface acoustic waves, and so on.

The above named various types of the coordinate input tablets, however, have their respective problems and disadvantages. In particular, those other than the electrode-contact type are almost unusable practically in applications for high-speed input works continued for a length of time for the coordinates of a multiplicity of points such as on figures and letters because the resolving power of input therein is poor or can be improved only by use of a very elaborate and consequently very expensive peripheral circuits or by increasing the size of the equipments.

On the other hand, those of the first mentioned electrode-contact type are practically advantageous in respect of the relatively simple structure and the low costs for the peripheral circuits although some problems are left to be solved as described below.

The coordinate input tablets used for inputting figures, letters and the like are classified into digital ones and analogue ones. Namely, the digital-type coordinate input tablet is constructed by two tablet elements each made of an insulating substrate sheet provided on one surface with an electroconductive layer formed in a pattern of an array of parallel lines by the technique of etching and the two elements are disposed in parallel to each other to have the surfaces provided with the conductive layers facing with each other keeping a narrow space therebetween in such a manner that the directions of the line-wise patterns of the electroconductive layers on the two elements are perpendicular to each other. The coordinates of a point at which one of the elements is pushed can be detected by the combination of the conductive lines on the elements which have been brought into contact with each other by pushing. The coordinate input tablet of the analogue type is constructed by disposing a resistance element having, on the whole surface of an insulating substrate sheet, a uniform thin resistance film and an electrode element of also sheet-like form to serve as a common electrode in parallel keeping a narrow space therebetween so that the coordinates of a point at which either of the sheets is pushed to bring the two sheets in contact with each other can be detected by means of the resistance of the resistance element between the peripheries of the resistance element and the pushed position.

Regardless of the type which may be digital or analogue, the electrode-contact type coordinate input tablet has an element made by providing an insulating sheet such as a plastic film with an electroconductive thin layer. Such a layer is usually formed by the techniques of vapor deposition or sputtering with a metallic material such as silver, palladium and the like or a semiconductive metal oxide such as indium oxide $In_2O_3$. Accordingly, the problems in the digital type tablets include the high cost to form the parallel line-wise pattern by the technique of etching and the difficulty in making electric connections between the lines and outer circuits in addition to the relatively high electric resistance of each of the lines, especially, when a high light-transmission is desired of the element necessitating to use extremely fine conductive lines or wires. In the analogue type tablets, on the other hand, it is an extremely difficulty matter to ensure high uniformity in the surface resistivity over the whole area of the resistance film so that the accuracy of the device is badly affected. The problems common to both of the digital and analogue type tablets are that high light transmission can hardly be obtained and the electroconductive layer is susceptible to mechanical damages due to the extremely small thickness to limit the yield of acceptable products and serviceable life thereof.

SUMMARY OF THE INVENTION

An object of the present invention is therefore to provide a low-cost see-through coordinate graphic input tablet having high durability and light transmission and capable of being operated with high reliability and high detecting accuracy of the coordinates of a point even as combined with relatively simple peripheral circuits.

Thus, the see-through coordinate graphic input tablet of the invention comprises:

(a) a first or lower tablet element, which is in the form of a rectangular sheet made of an electrically insulating transparent material and provided on one surface with a plurality of electroconductive lines each extending from a side to the opposite side of the rectangular sheet running in parallel with each other;

(b) a second or upper tablet element, which is in the form of a rectangular sheet made of an electrically insulating transparent material and provided on one surface with a plurality of electroconductive lines each extending from a side to the opposite side of the rectangular sheet running in parallel with each other, disposed above the first element in parallel without contacting therewith in such a direction that the surfaces of the first and the second elements provided with the electroconductive lines face each other and the running directions of the electroconductive lines on the first and the second elements are perpendicular to each other; and (c) at least one detecting resistor placed along a side of the first or second element having the ends of the electroconductive lines on said element in electrical contact with the resistor.

In the above described tablet of the invention, the total value of the resistance of the electroconductive line and the resistance of the detecting resistor is constant irrespective of the position along the side where the detecting resistor is provided.

BRIEF DESCRIPTION OF THE DRAWING

FIGS. 3a and 3b are a plan view and a side view, respectively, of a detecting resistor having a modified form mounted on a tablet element. FIGS. 4a and 4b are a plan view and a side view, respectively, of a similar detecting resistor having a further modified form.

FIGS. 5 and 6 each show an array of the electroconductive lines differing stepwise in the resistance for a unit length.

DETAILED DESCRIPTION OF THE PREFERRED EMBODIMENTS

Figure 1:
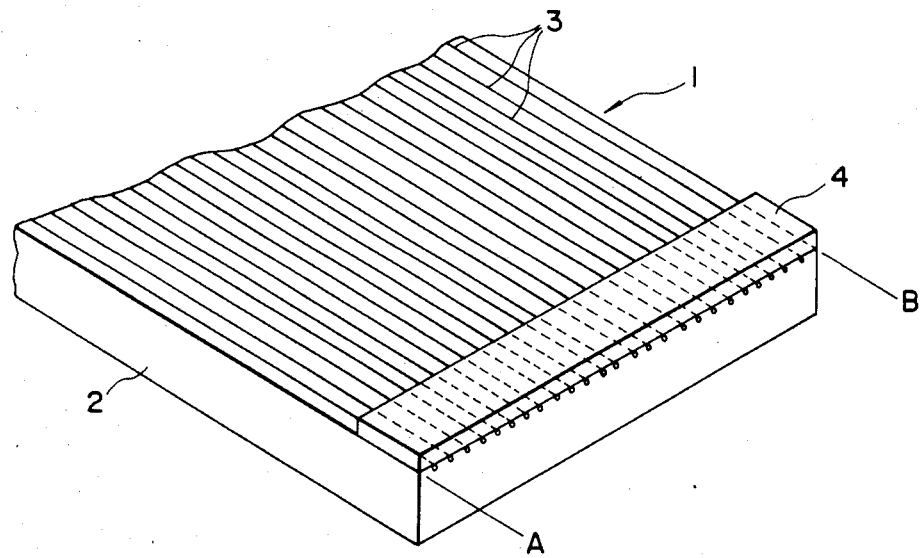
FIG. 1 is a perspective view of a tablet element according to the invention on which a detecting resistor is placed along a side of the rectangular sheet.
Figure 2:
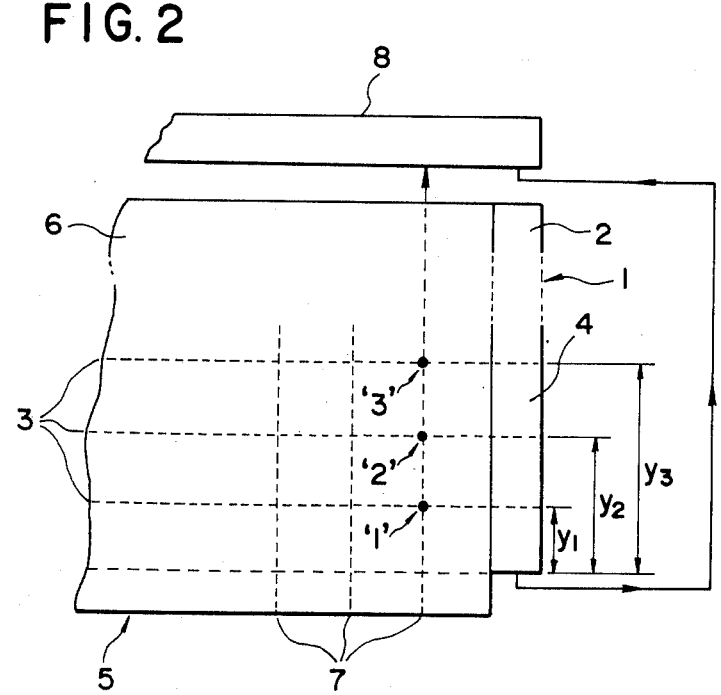
FIG. 2 is a schematic diagram for the illustration of the principle of detection of the y-coordinate in the inventive tablet.

As is shown in FIG. 1 illustrating the first or lower tablet element 1 which is formed of an electrically insulating, sheet-like rectangular substrate body 2 made of a transparent plastic resin, rubber and the like and a set of a plural number of electroconductive lines 3 on one of the surfaces of the substrate sheet 2 in parallel to each other, usually, at a uniform distance from the adjacent lines, a detecting resistor 4 is mounted on the substrate sheet 2 at the vicinity of a side periphery lying in the direction perpendicular to the electroconductive lines 3 in electrical contact therewith. The detecting resistor 4 has a role to input the information of the coordinate position to an outer circuit in the form of the resistance or voltage drop between the terminals A and B. As is shown in FIG. 2, another tablet element 5 formed of a transparent substrate sheet 6 and a set of conductive lines 7 having a similar structure as the above mentioned first or lower element 1 is overlaid the lower element 1 keeping a narrow space therebetween to ensure electric insulation by means of spacers in such a manner that the running directions of the sets of the electroconductive lines 3 and 7 on the lower and upper elements are perpendicular to each other. When the upper element 5 is pushed or depressed at the position '1', assuming that, in the detecting resistor 4, the resistance corresponding to the distance between the portion corresponding to this position and the lower end is $R_1$, the resistance of the electroconductive line 3 between the position '1' and the detecting resistor 4 is $R_2$ and the resistance of the electroconductive line 7 between the position '1' and the y-coordinate detector 8 is $R_3$.

In this case, the electric current passes the circuit from the y-coordinate detector 8 to the terminal of the detecting resistor 4 through the electroconductive line 7 and the position '1' after flowing in the detecting resistor 4 over a distance of $y_1$. Accordingly, the information of the coordinate of the position '1' can be obtained by detecting the voltage $V_1$ at the lower end of the detecting resistor 4 and the voltage $V_2$ at the upper end thereof.

The condition that the total value of the resistance $R_3$ of the electroconductive line 7 and the resistance in the detecting resistor 4 is constant irrespective of the position along the side periphery, i.e. the total value of $R_1$ and $R_3$ is constant, leads to the following equation:

$$R_1 + R_3 = R_o \text{ (set value)}. \tag{1}$$

Assuming that the set value of the electric current is $I_o$, then $V_1$ and $V_2$ are given by the following equations:

$$V_1 = (R_1 + R_2 + R_3)I_o \tag{2}$$

and $$V_2 = (R_2 + R_3)I_o. \tag{3}$$

Since $R_o$ and $I_o$ are each a set value in the equations (1), (2) and (3), the values of $R_1$, $R_2$ and $R_3$ can be calculated when the values of $V_1$ and $V_2$ have been determined by solving the simultaneous equations. In this case, the values of $R_1$ and $R_2$ correspond to the y-coordinate and x-coordinate of the point '1', respectively, so that the information on the coordinates of the point '1' can be obtained.

The detecting resistor may be positioned at any position traversing the plurality of the electroconductive lines although it is preferable that the detecting resistor is mounted along a side periphery of the substrate sheet in view of the demand for a compact design and easiness of taking the leader lines therefrom.

The detecting resistor may be a rod, wire or strip made of a material of high resistivity such as carbon, stainless steel, chromium, nickel and the like and the resistor is attached to the substrate sheet by adhesive bonding with a conductive adhesive, screwing, caulking and other mechanical means. Alternatively, the detecting resistor can be made by printing with a resistance ink, which is a dispersion of a fine powder of the above mentioned high-resistivity material in an ink vehicle, on the substrate sheet covering the terminal portions of the electroconductive wires by the techniques of screen printing, gravure printing, transferring and the like.

The transparent and electrically insulating material for shaping the substrate sheets in the inventive tablet is exemplified by general-purpose thermoplastic resins such as ABS resins, nylon resins, polypropylene resins, polyvinyl chloride resins and the like and thermosetting resins such as polycarbonate resins, polyester resins, epoxy resins, unsaturated polyester resins and the like as well as certain transparent elastomers such as silicone rubbers. These polymeric materials are used as shaped into a film, sheet or plate having a thickness of, for example, 0.050 to 0.400 mm to ensure flexibility although the substrate sheet for the lower element need not be flexible but can be rigid having a larger thickness depending on the particular manner of adaptation to the display screen. When the substrate sheet for the lower element is flexible, it is usually preferable that a rigid lining plate is provided on the lower surface of the flexible substrate sheet. Further, it is advantageous that the substrate sheet is in itself anti-glaring or is a laminate of a merely transparent sheet and an anti-glaring sheet so as to impart anti-glaring performance to the touch panel unit as a whole in order to decrease the eye fatigue of the operator working continuously for a long working time even when the display screen is self-emitting such as a CRT display.

The electrically conductive lines integrally bonded to the substrate sheet can be made of any conductive material having more than adequate mechanical strengths. Suitable material is usually a wire of a low-resistivity metal or alloy such as copper, aluminum, phosphor bronze, gold, nickel and tungsten as well as alloys thereof. The wire may be a solid wire or a stranded wire and the diameter thereof should preferably be in the range from 0.010 to 0.200 mm or should be relatively fine because the see-throughness of the inventive tablet may be decreased when the wires have a larger diameter. Threads or strings of an insulating material also can be used when plated of a low-resistivity metal above mentioned. Wires of a metal or alloy having a higher resistivity can also be used such as stainless steel, Nichrome and the alloys used for heater elements and EMIs. Furthermore, a sheet or film of an insulating material is provided with a coating with a conductive coating composition by roller coating, printing, vapor-deposition and the like followed by slitting into fine strips or ribbons which are bonded to the substrate sheet to form the conductive lines.

Although the conductive lines can be formed on the substrate sheet by printing with a conductive paint, the above mentioned electroconductive wires or strips should be bonded to the substrate surface by use of an adhesive. Namely, the surface of the substrate sheet is coated with an adhesive of general use such as acrylic, urethane-based, isocyanate-based and epoxy-based ones and the conductive wires or strips are bonded to the surface of the substrate sheet coated with the adhesive. When the substrate sheet is made of a thermoplastic resin, in particular, the conductive wires are mounted on the substrate in a parallel disposition keeping desired spaces from the adjacent ones and then gently pressed with heating to soften the plastic sheet so that the wires are partly sunk and embedded into the thus softened plastic sheet. When the substrate sheet is made of a rubber such as a silicone rubber, the wires are arranged on an uncured rubber sheet and gently pressed at room temperature to be partly sunk and embedded in the uncured rubber sheet followed by hot-air vulcanization.

FIGS. 3 to 6 illustrate different embodiments of the inventive see-through coordinate graphic input tablet. FIGURES 3a and 3b are a plan view and a side view, respectively, of an element 1 in which the detecting resistor 4 has a width increasing from one end to the other while the thickness is uniform so that the electric resistance per unit length of the resistor 4 is continuously decreased in inverse proportion to the width. Similar gradient in the resistance per unit length of the detecting resistor 4 can be obtained by the model illustrated in FIGS. 4a and 4b in which the detecting resistor 4 has an increasing thickness from one end to the other while the width is uniform.

FIG. 5 illustrates another embodiment in which the set of the electroconductive lines or wires is composed of wires made of alloys having successively increasing volume resistivity beginning with, for example, $6.4 \times 10^{-5}$ ohm.cm increasing by an increment of, for example, $0.2 \times 10^{-5}$ ohm.cm so that the resistance per unit length of the conductive wires increases stepwise. FIG. 6 illustrates a similar embodiment in which the conductive wires have an increasing diameter beginning, for example, with 0.020 mm increasing by an increment of, for example, 0.002 mm so that the resistance per unit length of the wires in a set increases stepwise. These embodiments are used when it is desired that the inventive input tablet has in itself a function of secondary conversion between the coordinates of the input position and the output information.

As is understood from the above given detailed description, the see-through graphic input tablet of the invention has following advantages of:

(a) the high reliability of electric contact on the electroconductive fine lines because the electric contact is obtained between the metal-made fine wires;

(b) the high accuracy in detecting the coordinate of the contacted because the resolving power is equal to the pitch of arrangement of the electroconductive lines so that the resolving power can be improved by increasing the geometrical accuracy of the arrangement of the lines or by increasing the accuracy of the detecting resistor, which directly reflects on the accuracy of the apparatus; and (c) the high durability of the apparatus because the electric contact is obtained between metal-made wires.

What is claimed is:

1. A see-through coordinate graphic input tablet which comprises:
    (a) a first or lower tablet element, which is in the form of a rectangular sheet made of an electrically insulating transparent material and provided on one surface with a plurality of electroconductive lines formed from wires of a low-resistivity metal, each wire extending from a side to the opposite side of the rectangular sheet running in parallel with each other;
    (b) a second or upper tablet element, which is in the form of a rectangular sheet made of an electrically insulating transparent material and provided on one surface with a plurality of electroconductive lines formed from wires of a low-resistivity metal, each wire extending from a side to the opposite side of the rectangular sheet running in parallel with each other, disposed above the first element in parallel without contacting therewith in such a direction that the surfaces of the first and the second elements provided with the electroconductive lines face each other and the running directions of the electroconductive lines on the first and the second elements are perpendicular to each other; and
    (c) at least one detecting resistor placed along a side of the first or second element having the ends of the electroconductive lines on said element in electrical contact with the resistor.

2. The see-through coordinate graphic input tablet as claimed in claim 1 wherein the total value of the resistance of the electroconductive lines and the resistance of the detecting resistor is constant irrespective of the position along the side where the detecting resistor is provided.

3. The tablet of claim 1 wherein the wires have a diameter in the range from 0.010 to 0.200 mm.

4. The tablet of claim 1 wherein the wires are bonded to the respective sheets by an adhesive.

5. The tablet of claim 1 wherein the wires are partly embedded into the respective sheets.

* * * * *